United States Patent
Kandler

(10) Patent No.: US 9,164,530 B2
(45) Date of Patent: Oct. 20, 2015

(54) ROTARY ACTUATOR

(71) Applicant: AUDI AG, Ingolstadt (DE)

(72) Inventor: Maximilian Kandler, Munich (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/383,293

(22) PCT Filed: Mar. 4, 2013

(86) PCT No.: PCT/EP2013/000614
§ 371 (c)(1),
(2) Date: Sep. 5, 2014

(87) PCT Pub. No.: WO2013/131630
PCT Pub. Date: Sep. 12, 2013

(65) Prior Publication Data
US 2015/0137729 A1 May 21, 2015

(30) Foreign Application Priority Data

Mar. 7, 2012 (DE) .......................... 10 2012 004 652

(51) Int. Cl.
*G05G 1/10* (2006.01)
*B60K 37/06* (2006.01)
*G05B 7/02* (2006.01)
*H01H 19/00* (2006.01)
*H01H 3/00* (2006.01)

(52) U.S. Cl.
CPC *G05G 1/10* (2013.01); *B60K 37/06* (2013.01); *G05B 7/02* (2013.01); *B60K 2350/102* (2013.01); *H01H 19/00* (2013.01); *H01H 2003/008* (2013.01)

(58) Field of Classification Search
USPC ................................. 318/558, 600, 652, 671
See application file for complete search history.

(56) References Cited

U.S. PATENT DOCUMENTS

| 5,187,630 | A | * | 2/1993 | MacKay et al. | ............... | 360/137 |
| 5,381,080 | A | | 1/1995 | Schnell et al. | | |
| 7,327,348 | B2 | * | 2/2008 | Goldenberg et al. | ......... | 345/156 |
| 7,499,023 | B2 | * | 3/2009 | Onodera | ........................ | 345/156 |
| 8,018,434 | B2 | * | 9/2011 | Gomez et al. | ................. | 345/157 |
| 2012/0249315 | A1 | | 10/2012 | Vanhelle et al. | | |

FOREIGN PATENT DOCUMENTS

| DE | 42 05 875 A1 | 9/1993 |
| DE | 200 14 425 U1 | 1/2001 |
| DE | 101 26 076 A1 | 12/2002 |
| DE | 10 2007 024 292 A1 | 11/2007 |

(Continued)

OTHER PUBLICATIONS

Office Action issued Jan. 15, 2013 for corresponding German Patent Application No. 10 2012 004 652.9.

(Continued)

*Primary Examiner* — Bentsu Ro
(74) *Attorney, Agent, or Firm* — Staas & Halsey LLP

(57) ABSTRACT

A rotary actuator, in particular for a motor vehicle, has an actuating element which can rotate about an axis, and a position sensor which detects the position of the actuating element in circumferential direction. The rotary actuator is disposed such that the rotational movement of the actuating element is continued a certain distance in the released state after manual actuation and is slowly decelerated.

20 Claims, 2 Drawing Sheets

(56) References Cited

FOREIGN PATENT DOCUMENTS

| | | |
|---|---|---|
| DE | 10 2007 039 318 A1 | 2/2009 |
| DE | 10 2009 037 184 A1 | 2/2011 |
| DE | 10 2012 004 652.9 | 3/2012 |
| JP | 2001-109558 | 4/2001 |
| WO | WO 2009/024231 A1 | 2/2009 |
| WO | WO 2011/033193 A1 | 3/2011 |
| WO | PCT/EP2013/000614 | 3/2013 |

OTHER PUBLICATIONS

International Search Report mailed Jul. 24, 2013 for corresponding International Patent Application No. PCT/EP2013/000614.

WIPO provided English translation of International Preliminary Report on Patentability mailed Sep. 12, 2014 for corresponding International Patent Application No. PCT/EP2013/000614.

* cited by examiner

ROTARY ACTUATOR

CROSS REFERENCE TO RELATED APPLICATIONS

This application is based on and hereby claims priority to International Application No. PCT/EP2013/000614 filed on Mar. 4, 2013 and German Application No. 10 2012 004 652.9 filed on Mar. 7, 2012, the contents of which are hereby incorporated by reference.

BACKGROUND

The invention relates to a rotary actuator, in particular for a motor vehicle, having an actuating element which can rotate about an axis and a position sensor which detects the position of the actuating element in the circumferential direction.

Such rotary actuators are used in motor vehicles and serve to control different functions which are displayed on a display. As a result, different systems such as, for example a navigation system, an integrated telephone, an infotainment system and the like can be actuated in the motor vehicle and individual functions within these systems can be controlled or selected. Rotary actuators are also known which can be additionally actuated axially in order to select a functions selected and marked by rotating the rotary actuator in a menu, by pressing. Such rotary actuators which have an axial switching function are referred to as turn and push actuators.

Rotary actuators usually have a control face which is profiled in a corrugated shape or sawtooth shape and an assigned latching element. When the rotary actuator rotates, the corrugated or saw-tooth-shaped control or face which interacts with the latching element is rotated. The latching element can be embodied as a leaf spring which has one or two latching projections which run over the profiled control face, as a result of which a clicking noise is generated in which case.

Since conventional rotary actuators latch in immediately in the released state after manual actuation, they are felt to be "static" by many users, and in addition, it is felt to be disadvantageous that in order to operate the rotary actuator it is necessary to use the entire hand, which has to engage around the rotary actuator completely. The force which has to be applied to this is also felt to be comparatively large by many users.

SUMMARY

One possible object relates to specifying a rotary actuator which can be actuated with relatively little expenditure of force.

The inventor proposes a rotary actuator, in particular for a motor vehicle, having an actuating element which can rotate about an axis and which is accommodated in a guide, and a position sensor which detects the position of the actuating element in the circumferential direction. According to the proposal, there is provision that said rotary actuator is embodied in such a way that the rotary movement of the actuating element continues a certain distance in the released state after manual actuation and is slowly decelerated.

One embodiment of the proposal is based on the idea of setting the rotary actuator in rotation merely by a slight impetus so that it is no longer necessary to use the entire hand to actuate the rotary actuator. Instead it is sufficient to push the rotary actuator with one or more fingers in order to make a selection in a menu. This provides the user with the advantage of being able to run through lists displayed on a display more easily and quickly, and in addition the proposed rotary actuator gives a feeling of quality as when operating a touch-sensitive surface (touchpad).

A first variant of the rotary actuator provides that the actuating element has a flywheel mass, the rotational impetus of which sets the actuating element in rotation in the released state. By touching and rotating the actuating element, the latter is given a rotational impetus by the user, and after the release the rotational movement of the actuating element continues a certain distance or for a certain time, wherein the rotational movement is braked under the influence of friction and finally stopped.

In this variant it is particularly preferred that the flywheel mass is arranged, preferably concealed, on the underside of the actuating element. The flywheel mass is therefore invisible to the user and it does not adversely affect the visual appearance of the rotary actuator. The contact between the corrugated or saw-tooth-shaped control face and the latching element is configured here in such a way that the friction is not too strong. Only if the friction is low does the actuating element continue to run a certain distance after the release.

As an alternative to the flywheel mass which acts as a drive, the rotary actuator can alternatively have an electric motor for driving the actuating element in the released state. The electric motor replaces here the manual actuation or continues it. After the actuating element has been set in rotation by the user, it is rotated further by the electric motor in order to generate a "running on effect".

According to one development, the rotary actuator can have a sensor detects manual actuation of the actuating element and is preferably embodied as a touch-sensitive sensor. Actuation by a user can be detected by the sensor, in particular in this way it is possible to detect whether the user has released the actuating element. One configuration provides that the sensor is embodied as a touch-sensitive sensor, with the result that touch can easily be detected. Alternatively, by evaluating the rotational speed of the actuating element it is also possible to determine whether the user has already released the actuating element. In the released state, a characteristic deceleration of the rotational movement occurs as a result of frictional influences, with the result that the released state can be detected in this way.

It is particularly preferred that the rotary actuator has a control device or is connected to a control device which switches on the electric motor after the end of manual actuation has been detected. The end of manual actuation can preferably be detected by the sensor, and alternatively the end of manual actuation can be determined by the explained evaluation of the profile of the rotational speed. After it has been detected that the user has released the actuating element, the electric motor is switched on and it rotates the actuating element further for a certain distance or a certain time while it is slowly decelerated and finally comes to a standstill. As a result of the drive by the electric motor, the rotational movement which is set in train manually is continued for a certain distance or a certain time period, as a result of which particularly easy starting of menu entries on a display is possible.

It also lies within the scope that the actuating element has an approximately disk-shaped or annular basic shape and is preferably arranged flush with the surface to form a positionally fixed component which surrounds the actuating element. Conventional rotary actuators or turn and push actuators are usually embodied in a cylindrical shape and protrude upward from a base surface. The actuating element can, however, be embodied flush with the surface or virtually flush with the surface to form a cover or a console, with the result that the rotary actuator can be embodied in a particularly flat way.

In addition, the inventor proposes a motor vehicle. The motor vehicle is defined by the fact that it has a rotary actuator of the type described.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
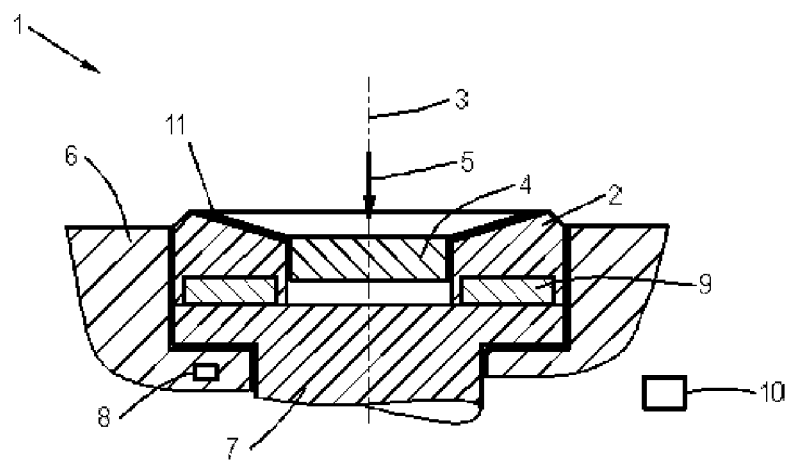
FIG. 1 shows a first exemplary embodiment of a proposed rotary actuator in a sectional view.

Reference will now be made in detail to the preferred embodiments of the present invention, examples of which are illustrated in the accompanying drawings, wherein like reference numerals refer to like elements throughout.

The rotary actuator 1 shown in a sectional side view in FIG. 1 comprises an actuating element 2 which can rotate about an axis 3. The axis 3 is simultaneously the axis of symmetry of the actuating element 2.

The actuating element 2 has an annular basic shape which can be seen from the outside, and in the center of the actuating element 2 there is a pushbutton key 4 which can be pressed axially in the direction of the arrow 5 by a force, as a result of which a switching pulse is triggered.

On its underside, the actuating element 2 has a shaft 7 by which the actuating element 2 is rotationally mounted. A position sensor 8 (illustrated schematically in FIG. 1) which detects the position of the actuating element 2 in the circumferential direction is assigned to the actuating element 2.

If the actuating element 2 is rotated manually about its axis 3 by a user, the movement is detected by the position sensor 8, as a result of which a switching signal is generated. This switching signal is used to control an input menu on a display of a motor vehicle in order to approach or select a menu item in a selection menu. The selected menu item can subsequently be selected by pressing the pushbutton key 4 in the direction of the arrow 5 by generating a switching signal by actuating the pushbutton key 4. In the exemplary embodiment shown in FIG. 4, the pushbutton key 4 is embodied as a central round pushbutton which is surrounded by the annular actuating element 2. However, alternative embodiments are also conceivable in which the actuating element itself is embodied as a key, i.e. the actuating element can be pressed in the vertical direction in order to generate a switching signal.

The rotary actuator 1 comprises an electric motor 9 which is integrated into the actuating element 2 and rotates the actuating element 2 in the switched-on state. The electric motor 9 is coupled to a control device 10 which controls it, i.e. the electric motor 9 is switched on or off by the control device 10; likewise open-loop or closed-loop control can be performed on the rotational speed of the actuating element. In addition, further drive elements such as a step-down transmission or the like can be provided.

On the upper side of the actuating element 2 a touch-sensitive sensor 11 is arranged which detects manual actuation of or contact with the actuating element 2. In the illustrated exemplary embodiment, the touch-sensitive sensor 11 is embodied as a contact sensor, but other variants, in which the touch-sensitive sensor is embodied as a proximity sensor, are also conceivable. The touch-sensitive sensor can also be embodied as a capacitive or inductive sensor.

As has already been explained, the user can manually set the actuating element 2 in rotation in order to approach or select a certain entry from a list of menu entries. The approached menu item can be displayed in another color or provided with a mark, likewise the list can be scrolled upward or downward on the display. This manual actuation in the form of contact is detected by the touch-sensitive sensor 11. Accordingly, it is also possible to detect whether the user has released the actuating element 2. If it has been detected by the touch-sensitive sensor 11 that the user has released the actuating element 2, the control device 10 switches the electric motor 9 on, and the electric motor rotates the actuating element 2 further by a certain distance. The electric motor 9 is controlled here in such a way that the rotational movement which is triggered by the user is lengthened or continued and the rotational speed is selected here in such a way that the actuating element is firstly rotated further with the rotational speed which is triggered by the user. The control device 10 subsequently controls the electric motor 9 in such a way that the rotational movement of the actuating element 2 is slowly decelerated until the actuating element 2 comes to a standstill.

The actuating element 2 can in this way be set in motion merely by tapping it with a finger and giving the actuating element 2 a small impetus. The rotational movement initiated by the user is continued by the electric drive after the actuating element 2 is released. The distance which the actuating element 2 rotates further when the electric motor 9 is switched on is comparatively short, with the result that the user can select individual menu entries or the like in a targeted fashion since he can intuitively estimate how far or how long the actuating element 2 runs on or continues to rotate after the release.

Figure 2:
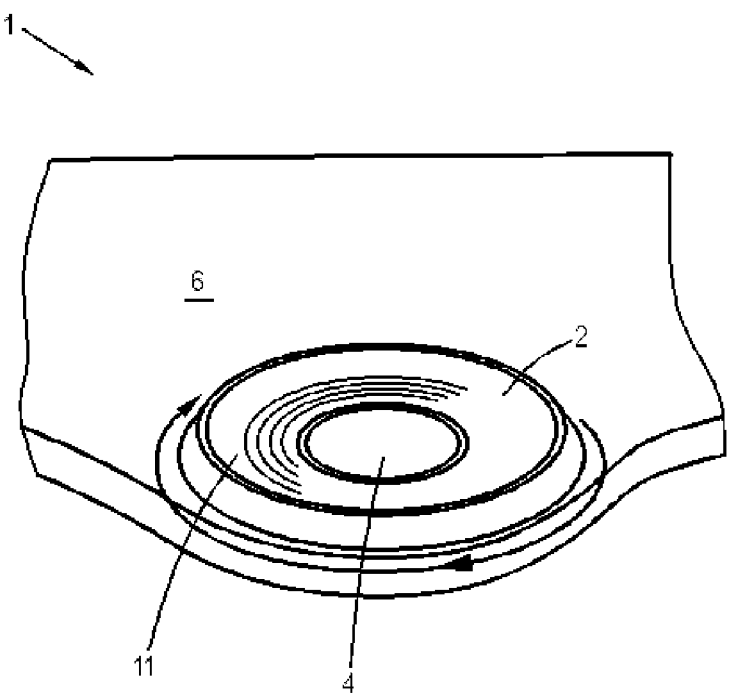
FIG. 2 shows the rotary actuator from FIG. 1 in a perspective view.

In FIG. 2 it is shown that the actuating element 2 is at least approximately flush with the surface, and at any rate it protrudes only slightly from a base surface 6, as is known from conventional actuating elements.

Figure 3:
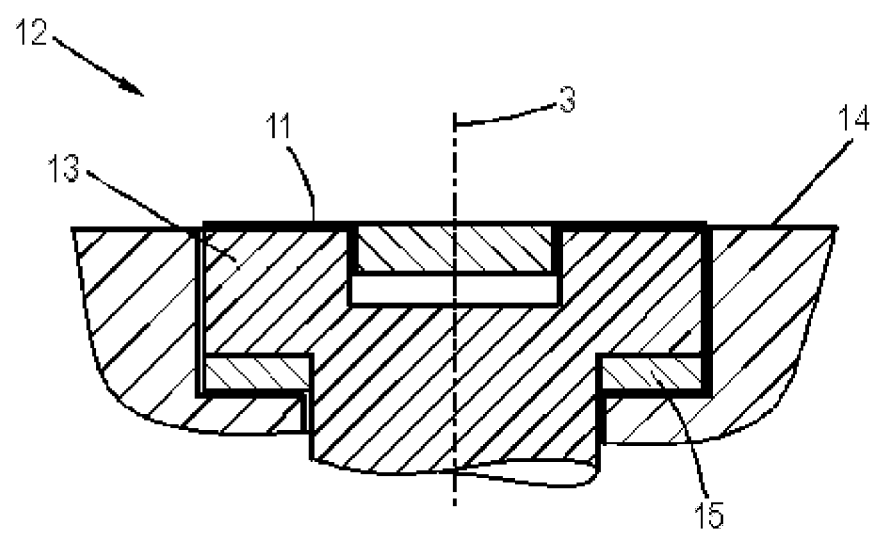
FIG. 3 shows a sectional side view of a further exemplary embodiment of the proposed rotary actuator.

FIG. 3 shows a second exemplary embodiment of a rotary actuator 12 in a sectional view. The rotary actuator 12 comprises an actuating element 13 which can rotate about the axis 3. The actuating element 13 is surrounded flush with the surface with a fixed component 14, as a result of which a visually particularly attractive appearance is produced. In addition to the rotary actuator shown in FIG. 3 with an actuating element which is flush with the surface, other embodiments are also conceivable in which the actuating element is embodied in a proud fashion and protrudes from the plane formed by the positionally fixed component.

In contrast to the exemplary embodiment above, the rotary actuator 12 does not have an electric motor and instead an annular flywheel mass 15 is attached to the underside of the actuating element 13, the rotational impetus of which flywheel mass 15 can set the actuating element 13 in rotation in the released state.

During the manual rotation of the actuating element 13 by a user, the actuating element 13 and the flywheel mass 15 connected fixedly thereto are given a rotational impetus, and after the release the actuating element 13 which is mounted in a guide rotates further under the effect of the kinetic energy, wherein the rotation is slowly decelerated by frictional influences. For the user a similar effect is produced as when the rotary actuator of the first exemplary embodiment is used, i.e. the actuating element 13 can be pushed slightly with a finger or with a plurality of fingers and set in rotation, and subsequently it runs on automatically until it comes to a stop at an end position. As a result, the selection of a specific menu item in a list can be carried out more quickly, and in addition the user is given a similar sensation to that with a touch-sensitive surface (touchpad).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A rotary actuator for a motor vehicle, comprising:
   an actuating element to rotate about an axis such that manual actuation of a user produces a manually actuated rotational movement of the actuating element, the actuating element not being manually actuated in a released state;
   a position sensor to detect a position of the actuating element in a circumferential direction;
   an electric motor to continue the manually actuated rotational movement of the actuating element a certain distance and to decelerate the actuating element, in the released state after manual actuation; and
   a control device to switch on the electric motor when an end of manual actuation has been detected.

2. The rotary actuator as claimed in claim 1, further comprising a sensor to detect manual actuation of the actuating element and to detect the end of manual actuation, the sensor being a touch-sensitive sensor.

3. The rotary actuator as claimed in claim 1, further comprising a sensor to detect manual actuation of the actuating element.

4. The rotary actuator as claimed in claim 3, further comprising a control device to switch off the electric motor if a renewed manual actuation has been detected by the sensor during operation of the electric motor.

5. The rotary actuator as claimed in claim 1, wherein the actuating element is approximately disk-shaped.

6. The rotary actuator as claimed in claim 1, wherein
   the actuating element is approximately disk-shaped,
   a positionally fixed component has a surface that surrounds the actuating element, and
   the actuating element is substantially flush with the surface of the positionally fixed component.

7. The rotary actuator as claimed in claim 1, wherein the actuating element is approximately annular-shaped.

8. The rotary actuator as claimed in claim 1, wherein
   the actuating element is approximately annular-shaped,
   a positionally fixed component has a surface that surrounds the actuating element, and
   the actuating element is substantially flush with the surface of the positionally fixed component.

9. The rotary actuator as claimed in claim 1, wherein
   the actuating element is approximately annular shaped, and
   the actuating element is provided around a pushbutton.

10. The rotary actuator as claimed in claim 9, wherein
    the control device scrolls through a menu of items when the actuating element is rotated, and
    the control device selects one of the items in the menu when the pushbutton is activated.

11. The rotary actuator as claimed in claim 9, wherein
    a positionally fixed component has a surface that surrounds the actuating element, and
    both the actuating element and the pushbutton are substantially flush with the surface of the positionally fixed component.

12. The rotary actuator as claimed in claim 1, wherein
    the manually actuated rotational movement is at a user-selected speed, and
    the electric motor maintains the user-selected rotational speed when the electric motor is switched on, before the actuating element is decelerated.

13. A motor vehicle comprising:
    a rotary actuator comprising:
       an actuating element to rotate about an axis such that manual actuation of a user produces a manually actuated rotational movement of the actuating element, the actuating element not being manually actuated in a released state;
       a position sensor to detect a position of the actuating element in a circumferential direction;
       an electric motor to continue the manually actuated rotational movement of the actuating element a certain distance and to decelerate the actuating element, in the released state after manual actuation; and
       a control device to switch on the electric motor when an end of manual actuation has been detected.

14. The motor vehicle as claimed in claim 13, further comprising a sensor to detect manual actuation of the actuating element and to detect the end of manual actuation, the sensor being a touch-sensitive sensor.

15. The motor vehicle as claimed in claim 13, further comprising a sensor to detect manual actuation of the actuating element.

16. The motor vehicle as claimed in claim 15, further comprising a control device to switch off the electric motor if a renewed manual actuation has been detected by the sensor during operation of the electric motor.

17. The motor vehicle as claimed in claim 13, wherein the actuating element is approximately disk-shaped.

18. The motor vehicle as claimed in claim 13, wherein
    the actuating element is approximately disk-shaped,
    a positionally fixed component has a surface that surrounds the actuating element, and
    the actuating element is substantially flush with the surface of the positionally fixed component.

19. The motor vehicle as claimed in claim 13, wherein the actuating element is approximately annular-shaped.

20. The motor vehicle as claimed in claim 13, wherein
    the actuating element is approximately annular-shaped,
    a positionally fixed component has a surface that surrounds the actuating element, and
    the actuating element is substantially flush with the surface of the positionally fixed component.

* * * * *